(12) United States Patent
Bauer

(10) Patent No.: US 6,267,918 B1
(45) Date of Patent: *Jul. 31, 2001

(54) APPARATUS AND PROCESS FOR LASER PREWEAKENING AN AUTOMOTIVE TRIM COVER FOR AN AIR BAG DEPLOYMENT OPENING

(75) Inventor: David J. Bauer, deceased, late of West Bloomfield, MI (US), by John W. Bauer, Jr., legal representative

(73) Assignee: TIP Engineering Group, Inc., Farmington Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/339,885

(22) Filed: Jun. 25, 1999

Related U.S. Application Data

(62) Division of application No. 09/063,141, filed on Apr. 20, 1998, which is a division of application No. 08/332,565, filed on Oct. 31, 1994, now Pat. No. 5,744,776.

(51) Int. Cl.[7] .................................................. B23K 26/00

(52) U.S. Cl. ................ 264/400; 219/121.7; 219/121.71; 219/121.83; 264/482; 264/156; 264/40.1; 425/174.4; 425/141

(58) Field of Search .................... 264/400, 482, 264/156, 40.1; 425/174.4, 141; 219/121.68, 121.69, 121.71, 121.83, 121.7

(56) References Cited

U.S. PATENT DOCUMENTS

| 3,626,143 | 12/1971 | Fry ........................................ 219/121 |
| 3,700,850 | 10/1972 | Lumley et al. . |
| 3,909,582 | 9/1975 | Bowen ................................ 219/121 |
| 4,169,976 | 10/1979 | Cirri ..................................... 219/121 |
| 4,504,727 | 3/1985 | Melcher et al. ..................... 219/121 |
| 4,537,809 | 8/1985 | Ang et al. ............................... 428/41 |
| 4,608,480 | 8/1986 | Bizot et al. .......................... 219/121 |
| 5,001,325 | * 3/1991 | Huizinga .......................... 219/121.69 |
| 5,059,761 | 10/1991 | Koegl et al. ..................... 219/121.83 |
| 5,103,073 | 4/1992 | Danilov et al. ................. 219/121.68 |
| 5,180,187 | 1/1993 | Muller et al. ........................ 280/732 |
| 5,335,935 | 8/1994 | Proos et al. .......................... 280/728 |
| 5,375,875 | 12/1994 | DiSalvo et al. ...................... 280/728 |
| 5,376,770 | 12/1994 | Kuhl et al. ...................... 219/121.83 |
| 5,589,090 | 12/1996 | Song .............................. 219/121.62 |
| 5,744,776 | * 4/1998 | Bauer .............................. 219/121.83 |
| 5,882,572 | * 3/1999 | Lutze et al. .......................... 264/482 |

FOREIGN PATENT DOCUMENTS

| 2 276 354 | * 9/1994 | (GB) . |
| 2-99324 | * 4/1990 | (JP) . |
| 5-185894 | 7/1993 | (JP) . |

OTHER PUBLICATIONS

Integral Passenger Side Inflatable Restraint Door With Laser Generated Tear Seam, Research Disclosure, Dec. 1993, p. 775 (Disclosed anonymouly).

* cited by examiner

Primary Examiner—Mathieu D. Vargot
(74) Attorney, Agent, or Firm—John R. Benefiel

(57) ABSTRACT

A process for preweakening the inside of an automotive trim piece cover layer of various constructions by use of a laser beam so as to enable formation of an air bag deployment opening in the trim piece formed at the time the air bag deploys. The laser beam impinges the inside surface of the cover to form a groove scoring or spaced perforations to form a preweakening pattern. A robot arm may be used to move a laser generator so as to form the preweakening pattern. The laser beam can be controlled in accordance with sensed conditions to achieve accurate preweakening, and may also be used to trim substrate panels and to perform other cutting operations.

18 Claims, 6 Drawing Sheets

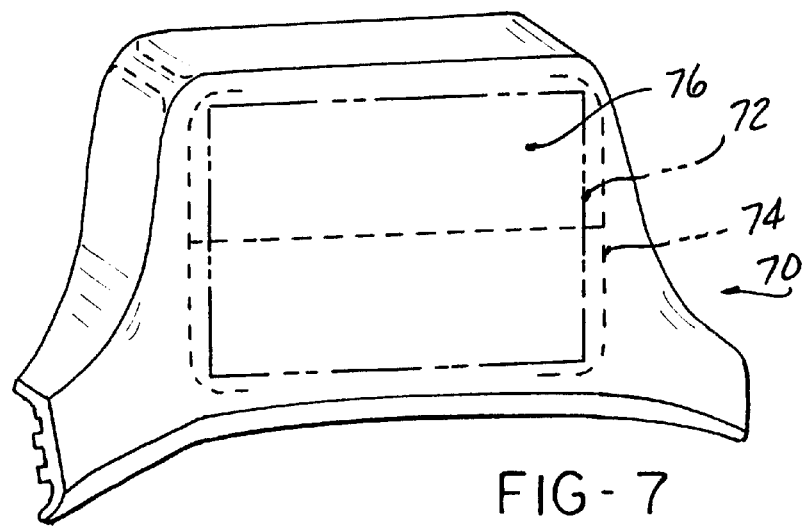
FIG-7
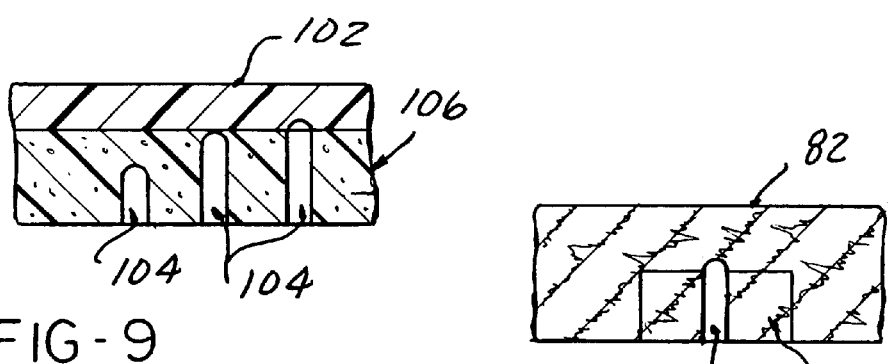
FIG-9
FIG-11
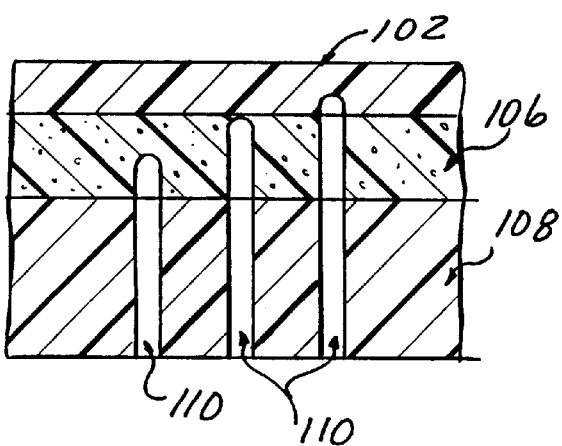
FIG-10
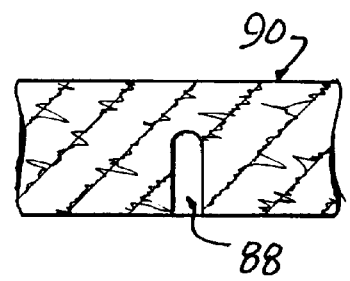
FIG-12

APPARATUS AND PROCESS FOR LASER PREWEAKENING AN AUTOMOTIVE TRIM COVER FOR AN AIR BAG DEPLOYMENT OPENING

CROSS REFERENCE TO RELATED APPLICATION

This application is a division of U.S. Ser. No. 09/063,141, filed Apr. 20, 1998 which is a division of U.S. Ser. No. 08/332,565, filed Oct. 31, 1994 which is now U.S. Pat. No. 5,744,776, issued Apr. 28, 1998.

FIELD OF THE INVENTION

The present invention concerns cutting and scoring of covers for automotive trim pieces enclosing air bag safety devices.

BACKGROUND OF THE INVENTION

Air bag safety systems have come into widespread use in automotive vehicles and light trucks and have been proposed for use in passenger trains and airplanes.

Such systems comprise an inflatable cushion, commonly referred to as an "air bag" which is stored folded in a storage receptacle and then very rapidly inflated, as with gas from a pyrotechnic gas generator, when a collision of the vehicle is detected by sensors. The air bag is thereby deployed in a position to absorb the impact of the driver or a passenger.

It is necessary that the folded air bag be stored in an enclosed secure environment within the passenger compartment, protected from tampering, and yet be allowed to properly deploy into the passenger compartment as the air bag is inflated.

It is critical that the air bag deploy within milliseconds of activation of the system in order to protect the occupant.

As noted, the air bag is enclosed within a storage receptacle, which is typically mounted behind an interior trim piece, such as a steering wheel cover in the case of the driver's side air bag, or a section of the instrument panel, in the case of the passenger's side air bag. It has been proposed to also provide side impact air bags in the vehicle doors.

One or more air bag deployment doors normally overlie the air bag receptacle and are forced open when the air bag is inflated to allow deployment of the air bag through the opening created by the door panel movement.

As described in U.S. Pat. No. 5,082,310 issued on Jan. 21, 1992 for an "Arrangement for Providing an Air Bag Deployment Opening", a seamless construction is advantageous in which the deployment door panels are not separately delineated within the expanse of the trim piece, but rather a smooth uninterrupted surface is provided extending over the deployment door substrate panels.

This construction necessitates severing portions of the covering of the trim piece in order to allow the door panels to hinge open.

Severing has been achieved by the pressure of the inflating air bag, or by various other methods which have been proposed, such as linear energy devices described in copending U.S. Ser. No. 08/279,225, filed Jul. 22, 1994. See also U.S. Ser. No. 08/027,114, filed Mar. 4, 1993, and U.S. Pat. Nos. 5,127,244 and 4,991,878 describing pyrotechnic elements used to cut the outer cover layer of the trim piece.

Cutter blades have also been proposed which are forced outwardly by the air bag inflation to assist in cutting the cover layer, but these outwardly swinging elements can present a potential hazard to a vehicle occupant seated in front of the deployment door.

Automotive interior trim covering materials such as vinyl plastic are relatively tough and difficult to sever, and also a predetermined severing pattern is necessary for proper door panel opening, such that heretofore preweakening grooves have been formed in the trim cover in a predetermined pattern to insure proper opening.

It has heretofore been proposed to provide an "invisible seam" installation in which the deployment door pattern is totally invisible to a person seated in the vehicle passenger compartment, and even faint outlines or "witness" lines are desirably avoided.

Scoring of the covering layer from the inside, if not done accurately, can over time become at least faintly visible from the exterior of the trim piece.

Fabrication of the automotive interior trim pieces with preweakening grooving particularly for invisible seam applications is thus a difficult manufacturing challenge.

First, the groove depth must be carefully controlled in order to achieve reliable rupture of the outer cover at exactly the right time during the air bag deployment event.

If the groove is too shallow, the thickness of the remaining material may be too great, presenting excessive resistance to severing, delaying air bag deployment. Conversely, if too little material remains, over time cracking may be result, or at least allow the appearance of externally visible "witness" lines.

The preweakening effect may also be less effective if the grooves are molded-in during the process since it has been found that cutting into plastic material such as vinyl has a better preweakening effect compared to molding-in the groove during the initial manufacture of the item.

The high pressures used in injection molding can cause a "crazing" effect at the thinned bridging material extending over the gap defined by the groove. This crazed zone is rendered more visible as the part is removed from the mold, particularly if the part is not completely cooled when it is being removed.

The net effect is that the molded groove becomes visible on the exterior side.

It is difficult to accurately and reliably control the depth of mechanical cutting of component materials such as sheet vinyl, since the material is variably compressed by the pressure of a cutting instrument.

U.S. Pat. No. 5,082,310, referenced above, describes a partial cutting procedure which is intended to enable accurate control over the depth of the cut into a sheet of pliant plastic material such as a vinyl skin. However, a purely mechanical cutting operation still has other inherent accuracy limitations and is slow to execute.

Also, some cover materials have irregular inside surfaces, i.e., dry powder slush processes create such irregularities. If the groove depth were constant, this results in an irregular thickness of the remaining material. This leads to erratic performance as the resistance to opening pressure will vary greatly.

The groove width is also important, in that if a too narrow groove is cut into many plastics, a "self healing" may occur, particularly at elevated temperatures in which the groove sides will re-adhere to each other, causing the preweakening effect to be erratic or neutralized.

The required groove width also varies with the notch sensitivity of the material being preweakened.

A further difficulty is encountered in assembling the preweakened component to the interior trim structure so that the lines of preweakening are properly registered with the other components. For example, the vinyl skin in a skin and foam instrument panel must be accurately positioned on the instrument panel substrate and the deployment door substrate panels so that the preweakening lines are stressed as the door edges hinge out under pressure from the air bag.

This alignment requirement creates manufacturing difficulties and increased costs particularly since a variety of forms of instrument panel structures are employed, i.e., skin and foam, vinyl clad, hard plastic with a finished surface, etc., since a variety of forming techniques are employed, i.e., vacuum formed calendared plastic sheet, day powder slush molded, injection molded, etc. A leather covering later sometimes may be used in lieu of a vinyl plastic covering layer.

Accordingly, it is an object of the present invention to provide a process for preweakening trim components overlying an air bag installation by groove scoring which is highly accurate in production implementation, and which may be efficiently integrated into the trim piece manufacture to lower costs and improve results.

SUMMARY OF THE INVENTION

According to the invention, the preweakening groove scoring of a smoothly contoured trim piece cover material overlying an air bag receptacle is carried out by the use of a laser beam which is controlled and guided so as to produce grooves of a precise depth and width formed by the laser beam energy into the undersurface of various trim piece cover materials such as a vacuum formed sheet of vinyl.

A sensor provides a feedback signal allowing relative positioning of the workpiece and/or varying of the laser beam source intensity or to precisely control the groove depth to achieve a constant thickness of the remaining material.

The workpiece and laser beam source can be mounted for relative movement in a two-axis positioner table, or alternatively, a system of movable reflectors can optically generate the groove pattern.

A five axis robotic arm can also be used to guide the laser beam source in the required pattern extending in three dimensions, and in process or post-process gauging can also be utilized to correct the laser and robot control and improve results.

The laser beam preweakening groove scoring can be carried out on the cover piece prior to its incorporation into the trim piece or such groove scoring can be carried out after attachment to a substrate or other trim elements grooving the underlying substrate and partially scoring the cover layer at the same time to create a deployment door substrate panel while preweakening the cover material.

The laser beam apparatus can further be utilized to trim the assembled trim piece.

DESCRIPTION OF THE DRAWINGS

FIG. 7 is a front perspective view of a steering wheel cover which overlies an air bag installation and which has been preweakened in a predetermined pattern with a laser scored grooving.

FIG. 9 is an enlarged sectional view of a vinyl cladding cover material which has been laser scored with grooves of various depths.

FIG. 10 is an enlarged sectional view of a layer of vinyl cladding vacuum formed to a thermoplastic substrate such as for an instrument panel trim piece which has been laser scored with grooves of various depth.

FIG. 11 is an enlarged sectional view of a leather covering material which has been pretreated and subsequently laser scored through the pretreated region.

FIG. 12 is an enlarged sectional view of the leather covering material which has been laser scored without the pretreatment in the region of the scoring.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

The present invention is concerned with preweakening of an automotive interior trim piece such as a steering wheel cover or an instrument panel overlying an air bag receptacle stored behind the trim piece. The surface of the interior trim presented to the passenger compartment must be aesthetically pleasing rather than starkly utilitarian. There has also been developed a preference for eliminating any suggestion of the presence of the stored air bag. In the past, separately defined deployment doors have been fit into an opening in the instrument panel. In the case of a wheel cover, visible delineations segmenting the cover to form deployment doors have been provided.

Internal grooves have also been provided, typically molded into the trim piece itself.

As described above, molded grooves have sometimes resulted in exteriorly visible "witness" lines, since the high injection pressures forcing the plastic through the narrow gap remaining above the groove has resulted in a crazing pattern, as well as slight cracking when the part is removed from the mold.

The present invention comprises the process of laser scoring to obtain the preweakening internal groove after the cover has been molded or otherwise formed.

A laser beam is directed at the cover layer or other trim piece component to score the component along a path defining the desired pattern matching the deployment doors.

The laser scoring has been found to result in elimination of any exteriorly visible lines, even where minimum material remains above the scoring groove.

Figure 1:
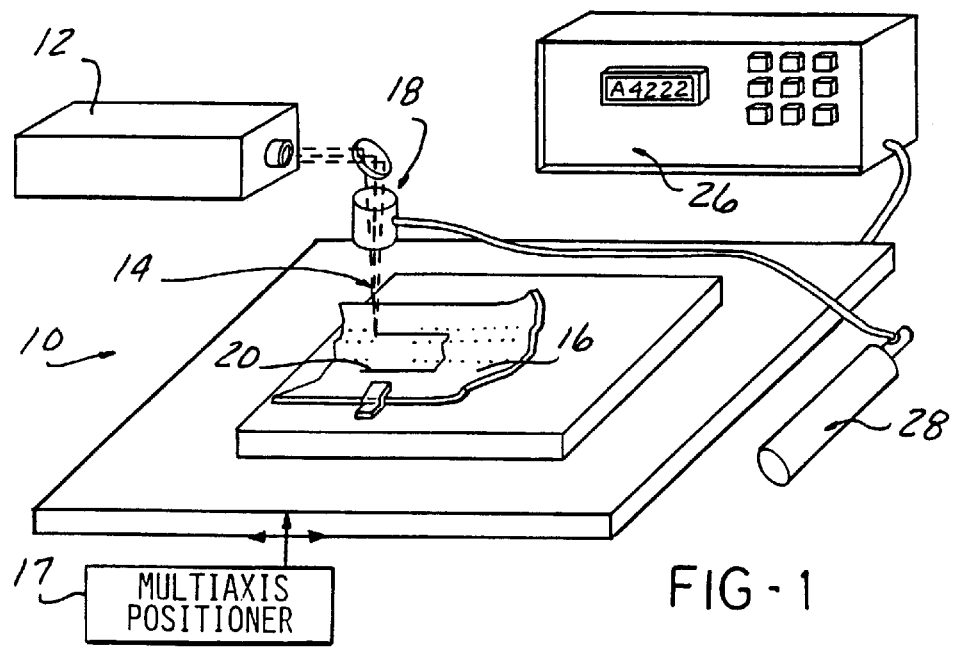
FIG. 1 is a perspective diagrammatic view of a laser beam scoring apparatus having a trim piece disposed therein being preweakened in a predetermined pattern by laser beam groove scoring.
Figure 2:
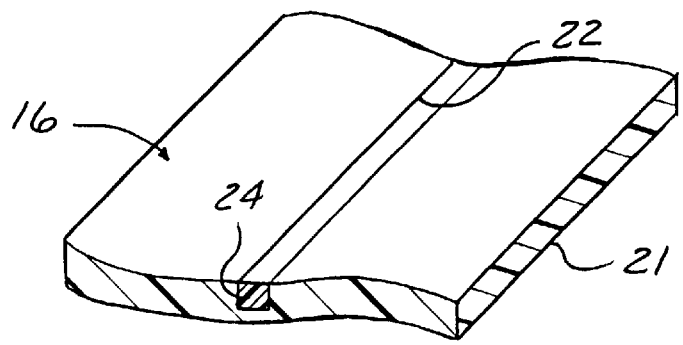
FIG. 2 is a fragmentary view of a trim piece having a preweakening groove formed therein back filled with a filler material.

Referring to a first embodiment (FIG. 1) of a laser scoring apparatus 10 suitable for practice of the invention, a small (25–150 watt) carbon dioxide gas laser source 12 producing a coherent infrared laser output beam 14 at 10.6 micron wavelength is driven to effect controlled scoring of a region of a polymer sheet material instrument panel cover 16 extending over an air bag installation when installed. The cover 16 is moved relative the laser source 12 to cause tracing of a particular pattern at a precise rate of scoring by a multiaxis positioning system 17. The laser output beam 14 is focused to a spot or small diameter pencil beam using one or more focusing elements 18 to cause formation of a score line 20 of acceptable width. The presence of the score line 20 which is cut to a significant depth generates a seam which is invisible when viewed from outside face 21 of cover 16 (FIG. 2). The outside face 21 of cover 16 forms the cosmetic surface presented to occupants of the vehicle.

The width of the score line 20 is generally minimized in typical applications but self healing may be avoided when necessary by making wider cuts which may be backfilled with a material having physical properties having generally beneficial physical properties for improving bursting of the invisible seam during air bag operation in the vehicle.

For example and referring to FIG. 2, a portion of a polymer sheet instrument panel cover 16 with a wide score line 22 and with filler 24 comprising a cured in place silicone rubber bead is shown. Filler 24 provides mechanical support in a similar fashion as was experienced before polymer was removed by the laser. The mechanical support provided by filler 24 prevents deterioration of cover 16 over the lifetime of the vehicle.

Typical focusing elements for infrared laser 12 comprise gallium arsenide or germanium refractive lens members, or gold reflective members. Several alternate laser types will achieve good results and laser source 12 may be an excimer, solid state, argon gas, or diode laser. However, the carbon dioxide laser is likely to be the least expensive in both initial cost and over the required lifetime.

If laser source 12 produces continuous output, the depth of the score line 20 is controlled by the laser output power density at the surface of cover 16 and the rate at which cover 16 moves relative the beam 14.

In another process, laser source 12 may be controlled to generate pulses of a laser output beam, each pulse removing by heat ablation or combustion a minute quantity of cover 16 material. Depth is therefore controlled by applying a particular number of pulses before moving to an adjacent, possibly overlapping, site on the inside of cover 16. The pulsed laser technique combined with a stepwise movement of cover 16 should result in superior control over the process when a computer based controller 26 is used.

Multiaxis positioning system 17 may be driven by a multiplicity of electric motors controlled by a small computerized controller 26 as shown, or alternatively, by electromechnical actuation of a multiplicity of cams and mechanical devices which move the cover 16 in a proper pattern at appropriately controlled rates.

In most industrial applications, the focusing elements 18 must be maintained clean and free of blowback debris emanating from the score line 20. A free flowing gas system 28 is frequently employed to achieve focusing element 18 cleanliness. Also, certain gases, if directed to the score line 20 formed at the laser impingement area, will alter the chemistry and thermodynamics at the scoring site. For example, inert gases such as nitrogen or argon can displace the oxygen in the air at the impingement site and prevent both charring and local combustion while keeping the focusing elements clean. Alternate gases and flow rates can dramatically alter the properties of the resulting score line 20 and create a wide range of physical properties of the cover 16.

Figure 3:
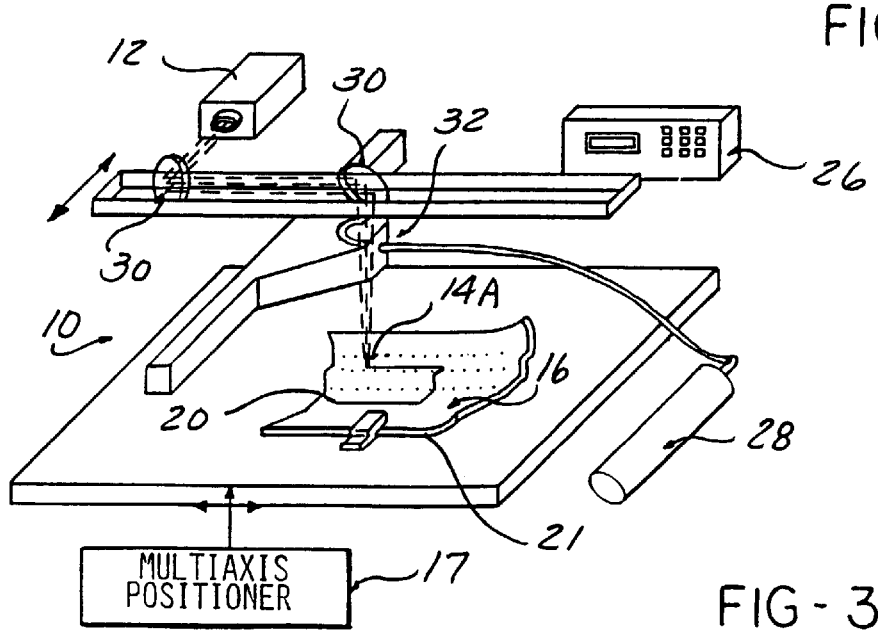
FIG. 3 is a perspective diagrammatic view of another form of the laser beam scoring apparatus according to the invention and having a trim piece disposed therein being preweakened in a predetermined pattern by laser beam groove scoring.

FIG. 3 shows yet another embodiment in which the cover 16 is maintained in a fixed position and the laser output beam 14A is manipulated by a system of controlled positioning translating mirrors 30 and a controlled positioning focusing system 32.

Figure 4:
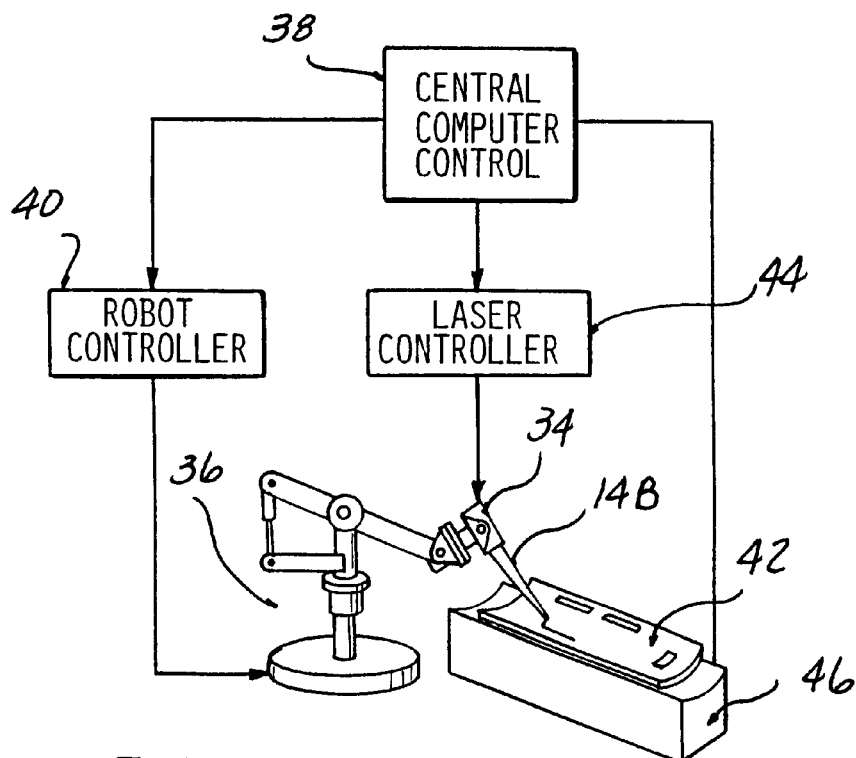
FIG. 4 is a perspective, simplified representation of a preferred robot arm form of the laser beam scoring and cutting apparatus together having a trim piece disposed therein being trimmed and preweakened in a predetermined pattern by laser beam groove scoring.

FIG. 4 illustrates a preferred form of the invention, in which a self-contained laser generator 34 is mounted to a robot arm manipulator 36, which moves the laser generator 34 under program control stored in a central computer control 38 and directing a robot controller 40, so as to cause a focused laser beam 14B to trace a pattern on a trim piece cover 42 corresponding to a programmed score line.

The computer controller 38 may also be connected to a laser controller 44 which can vary the operation and power level of the laser generator 34.

The cover 42 is fixtured on an ultrasonic sensor 46 which generates signals corresponding to the thickness of material remaining after the groove scoring is produced by the laser beam 14B such as to provide a feedback signal to the central computer control 38 to vary the position of the laser generator 34 and/or its power output to precisely control the thickness of material remaining after the groove scoring is produced. The resistance to tearing of the remaining material above the groove is important to proper air bag deployment and hence its thickness should be controlled.

Such ultrasonic sensors capable of gauging internal features, such as material thickness, are commercially available, and hence details are not here given.

The laser generator 34 is preferably of the "diffusion cooled" type which does not require gas line hookups and thus is readily mountable to a robot arm manipulator. Accordingly, the optical system is simplified as the beam is directed by robot arm motion, lower costs and improving performance. A more rugged, reliable installation also results, suited to a production environment.

Diamond™ lasers available from Convergent Energy of Sturbridge, Massachusetts are perfectly suited for this application.

Figure 4A:
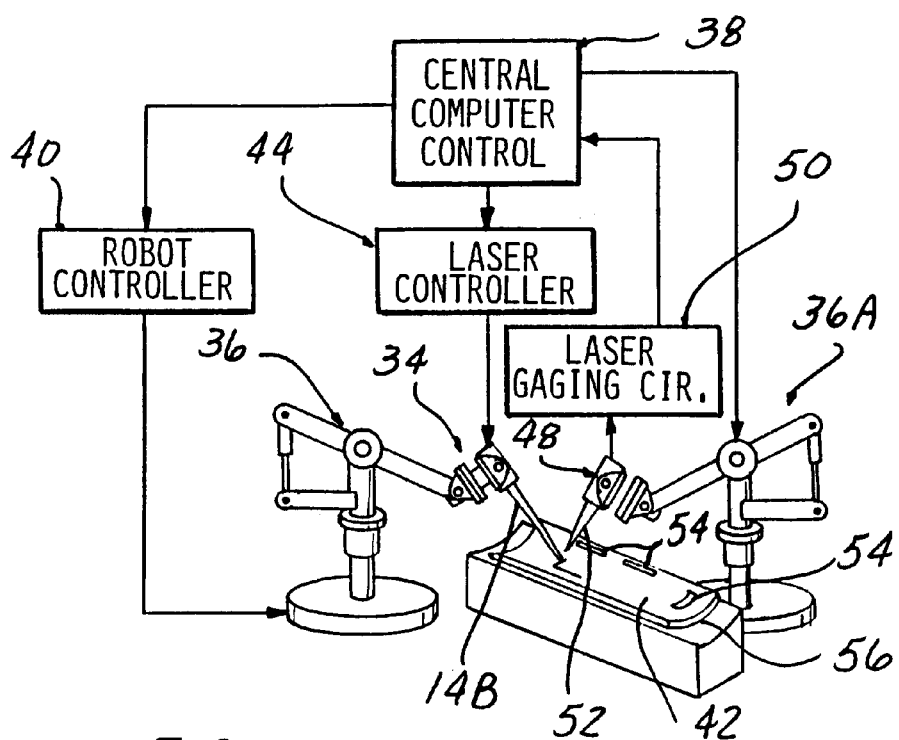
FIG. 4A is a perspective, simplified view of the robot arm laser beam scoring and cutting apparatus of FIG. 4 with an added robot arm for in-process gauging of the trim piece surface.

FIG. 4A shows a variation wherein a second robot arm 36A is provided which manipulates a gauging laser beam generator 48, directing and reflects low power laser beam 52 upon the cover 42, which reflected laser beam is detected and analyzed in a laser gauging circuit 50. From this, there is developed a signal in the laser gauging circuit 50 indicating the precise location of the cover surface at a point just ahead of the cutting laser 14B. This allows the central computer control 38 to cause the position of the cutting laser beam generator 34 to be shifted by the robot arm 36 correspondingly (or to adjust the output beam) so as to maintain a groove depth which will produce a constant thickness of remaining material.

The laser beam can be directed to not only produce the scoring of the cover 42, but may produce cutout openings 54 therein. Further, the perimeter of a substrate panel 56 to which the cover 42 is assembled can be trimmed as well, achieving significant manufacturing economies.

Figure 5A:
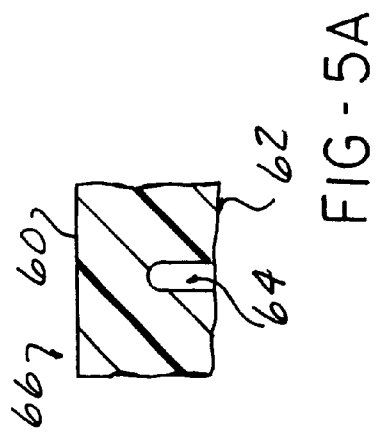
FIG. 5A is a sectional view of the cover of FIG. 5 taken across the preweakening groove.
Figure 5:
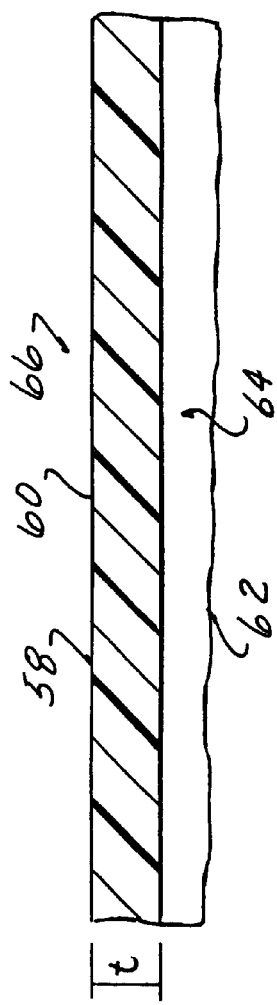
FIG. 5 is an enlarged, fragmentary sectional view taken through a dry powder slush molded cover and along a preweakened laser scored groove.

FIGS. 5 and 5A illustrate the application of the above-described process to a cover panel 58 formed by a dry powder slush molding operation. This process is commercially practiced by depositing a powder on a heated mold surface, which results in a smooth outer surface 60, grained and painted, which is exposed within the passenger compartment. The other surface 62 is relatively rough, and hence a relatively varying depth groove 64 is necessary to leave a constant thickness t of a remaining material. The thickness t must be controlled to achieve a predictable tearing strength and to avoid any visible indication on the outer surface 60.

Thus, gauging of the thickness t, as with an ultrasonic gage, is necessary, varying the depth of the groove 64 to maintain the thickness t.

Figure 6:
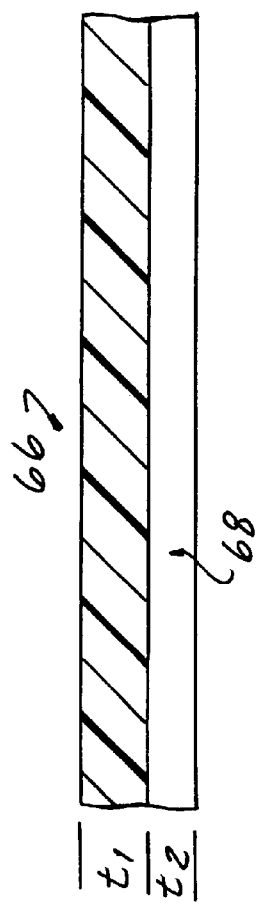
FIG. 6 is an enlarged, fragmentary sectional view taken through smooth calendared sheet stock, vacuum formed into an air bag installation cover layer, laser scored from the undersurface.

FIG. 6 shows a segment of a cover 66 vacuum formed from smooth calendared sheet vinyl. In this case, the groove 68 may be of constant depth inasmuch as both surfaces are smooth and the combined thickness $t_1$ of the remaining material is constant.

In both examples, the covers 58, 66 are assembled in a mold after scoring, together with an instrument panel substrate (not shown), and foam injected into an intervening space to bond together the substrate and cover, as well as deployment door panels and frame, into a unitary trim piece.

Figure 8:
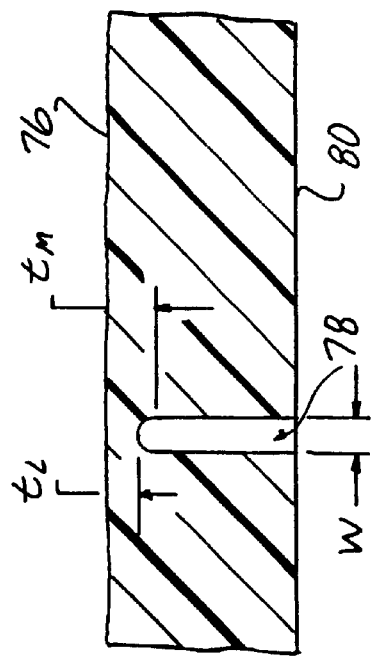
FIG. 8 is an enlarged sectional view of a portion of the steering wheel cover shown in FIG. 7, the section taken across the laser formed groove.

FIGS. 7 and 8 illustrate the process applied to an injection molded wheel cover 70, having an air bag receptacle indicated in phantom at 72, aligned with a preweakening pattern 74 arranged beneath the main outer surface 76, which may be grained and painted, as indicated.

The preweakening pattern consists of a series of laser scored grooves 78 in the inner or rear face 80.

The width w of the groove is sufficient to avoid self healing. The thickness $t_L$ of the material remaining above the laser beam scored groove 78 may be less than the remaining thickness $t_M$ of a molded groove and still remain invisible from the finished surface 76.

It is also noted that the laser scoring process can be carried out very rapidly, and saves processing time over the molding time where a long cooling interval is required to avoid cracking over the thinned out region above the preweakening groove.

The scoring depth can vary from 20%–80% of the total thickness depending on the available tearing force, the strength of the material used, and whether or not other assisting devices are employed.

FIGS. 9 and 10 show the application of the process of vinyl cladding covers. In FIG. 9, an outer vinyl layer 102 is bonded to a polypropylene foam backing layer 106 to form a composite cover. Laser scored grooves 104 extend into the rear face to various exemplary depths, i.e., partially into layer 106, completely through the layer 106, or partially through the covering layer 102. The groove depth required depends on the needs of the particular application, i.e., the level of force designed to cause rupture of the preweakened seam.

In FIG. 10, the vinyl cladding layer 102 and backing layer 106 are vacuum formed and adhesively bonded to a thermoplastic substrate 108. In this case, the laser scored grooves 110 also penetrate the substrate 108.

FIGS. 11 and 12 illustrate the process applied to a leather cover 82. In FIG. 11, a groove 84 is laser scored into a zone 86 which has been pretreated with lacquer to be more notch sensitive as described in detail in copending U.S. Ser. No. 08/109,122, filed Aug. 13, 1993.

In FIG. 12, a groove 90 is laser scored into an untreated leather cover 88.

Figure 13:
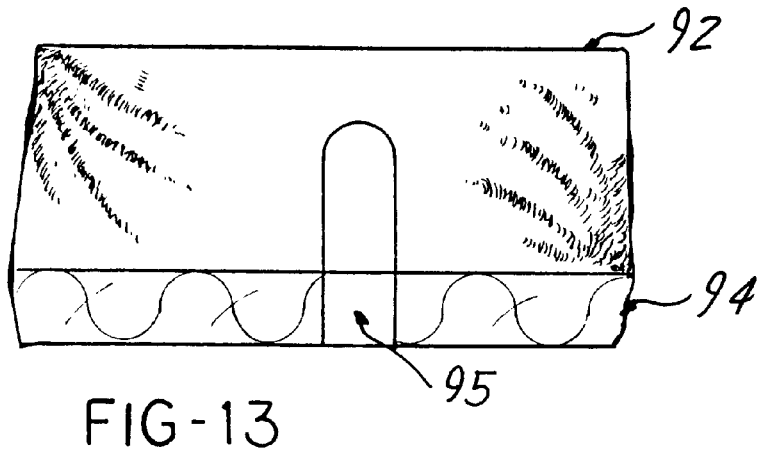
FIG. 13 is an enlarged sectional view of a cosmetic covering such as a fabric material having a backing layer, preweakened by being laser scored to penetrate the backing layer.

FIG. 13 illustrates the process applied to a cosmetic cover layer 92, shown as a textile material as might be used with a side impact air bag system, which has a scrim backing layer 94 bonded thereto.

The laser scored groove 95 penetrates completely through the backing scrim 94 and partially through the textile layer 92.

Figure 14:
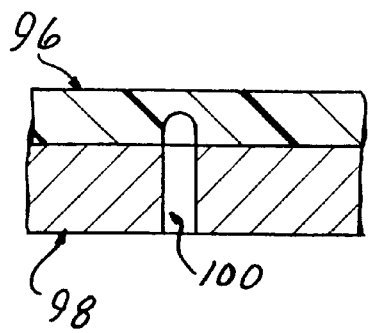
FIG. 14 is an enlarged sectional view of a composite cover comprised of a metal substrate panel with an overlying skin, both preweakened by a laser-formed groove.
Figure 15:
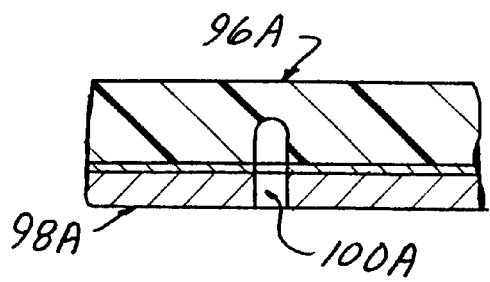
FIG. 15 is an enlarged sectional view of molded urethane with a molded-in-place scrim, both preweakened with a laser formed groove.

FIGS. 14 and 15 show applications to miscellaneous composites.

In FIG. 14, a cosmetic skin 96, such as a vacuum formed vinyl sheet, is applied over a metal substrate 98 (such as aluminum or steel). In this instance, the laser scoring forms a groove 100 completely penetrating the metal substrate 98 and partially penetrating the cover skin layer 96 to create the preweakening.

FIG. 15 shows a skin 96A over scrim backing 98A, penetrated with the laser scored groove 100A.

Figure 16:
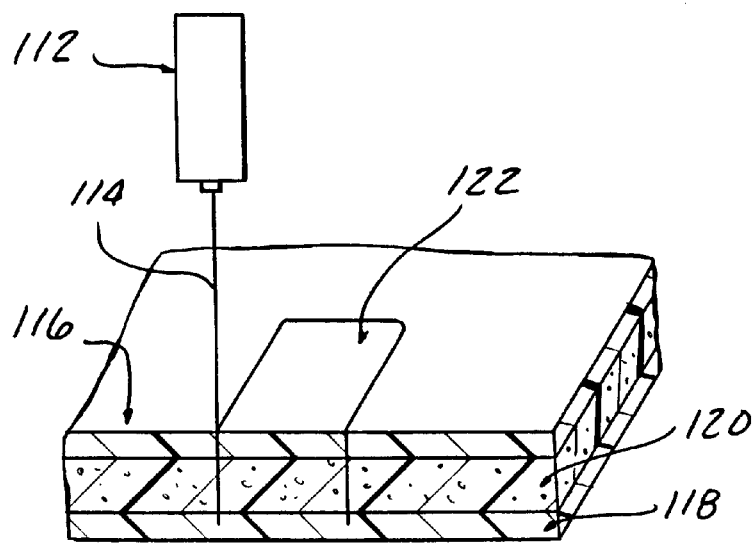
FIG. 16 is a fragmentary section of a trim piece workpiece in which the substrate is being cut at the same time the covering layer is being scored.

Referring to FIG. 16, a laser generator 112 can direct a laser beam 114 at the reverse side of a substrate panel 116 underlying a cover layer 118 and intervening foam layer 120 provided in a skin and foam construction.

The power of the laser beam 114 can be controllably varied so as to completely penetrate the substrate panel 116 and foam layer 120, but only partially penetrate the inside of the cover 118, as indicated, creating the preweakening by a laser scoring.

A deployment door panel 122 is thus formed at the same time, perfectly aligned with the preweakening pattern of the cover 118.

The use of a laser beam enables preweakening by other forms than a straight groove.

Figure 17:
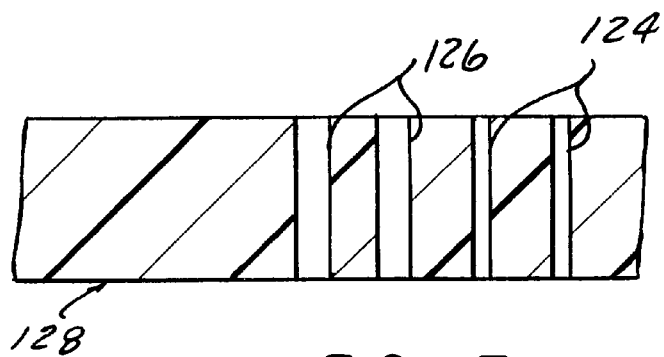
FIG. 17 is a sectional view of a trim piece being preweakened by being perforated with an intermittently generated laser beam.

As shown in FIG. 17, a series of round perforations 124 or slots 126 are formed in the cover 128 by intermittent operation of the laser generator.

Figure 18:
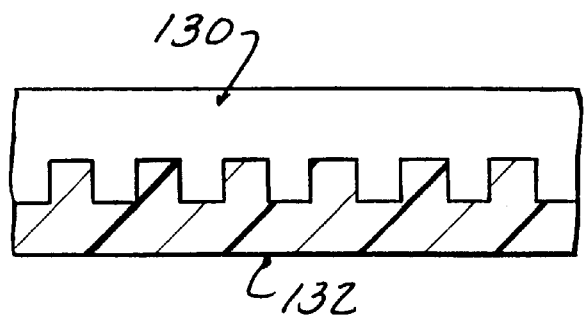
FIG. 18 is a sectional view of a trim piece being scored to variable depths with a pulsating laser beam.

FIG. 18 shows a stepped, variable depth groove 130 formed in a cover 132 which varies in depth along its length.

This shape may be produced by pulsating operation of the laser generator, resulting in a cyclically varying intensity laser beam.

Figure 19:
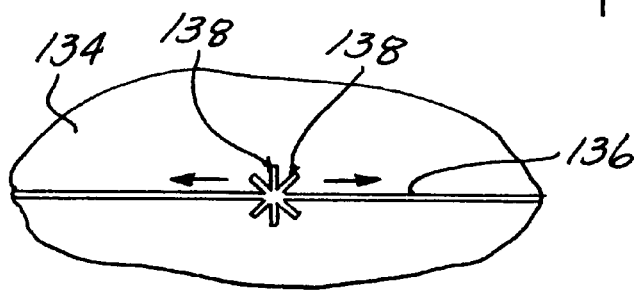
FIG. 19 is a fragmentary plan view of a laser scored groove with traverse slits added to establish local weakening to control the site at which tearing is initiated.

FIG. 19 shows a localized preweakening of a cover 134 having laser scored preweakening groove 136 formed therein. A series of crossing grooves 139 are formed across the groove 136 at a selected locale. This creates a preferential intermediate point at which severing will proceed in opposite directions as indicated.

The preweakening process is readily applicable to all conventional types of trim piece construction, i.e., skin and foam with both vinyl and leather skins (vacuum formed, dry powder, molded, injection molded) vinyl clad, or hard plastic with a surface finish.

What is claimed is:

1. A process for constructing a preweakened automotive interior trim piece covering an air bag installation, said preweakening applied in a predetermined pattern in a particular location so as to enable formation of an air bag deployment opening in said trim piece, said opening formed by pressure exerted by deployment of an air bag from said installation, said trim piece having a cover layer with an outer surface visible from within said vehicle interior and extending smoothly and uninterruptedly across said preweakening at said particular location, said trim piece also having an inside surface, said process including the steps of:

preweakening said trim piece by directing a $CO_2$ laser beam along said inside surface of said trim piece to produce said preweakening by removing material from said trim piece along said predetermined pattern;

monitoring the extent of material remaining during removal of material by said laser beam; and, controlling the extent of material removed by said laser beam in accordance with the results of said monitoring step to effect a predetermined preweakening of said trim piece in said predetermined pattern by removing material on an inner side of said cover layer to remove material so as to produce a series of spaced apart partial penetrations in said cover layer spaced along said predetermined pattern, said partial penetrations not extending into said outer surface of said cover layer to form a stepped depth configuration.

2. The process according to claim 1 wherein said monitoring step includes the step of sensing material thickness from said outside surface of said cover layer along said predetermined pattern to determine the material thickness remaining during preweakening by said laser beam.

3. The process according to claim 1 wherein said monitoring step includes the step of sensing material thickness from said inside surface of said trim piece to determine the preweakening effected by said laser beam.

4. The process according to claim 1 wherein said preweakening is continuous on inner regions of said trim piece behind said cover layer.

5. The process according to claim 1 wherein said laser is operated intermittently to form said partial penetrations.

6. The process according to claim 1 wherein said controlling step includes the step of controlling operation of a laser beam generator generating said laser beam.

7. The process according to claim 6 further including the step of changing the relative position of said trim piece and said laser beam generator to cause said laser beam to be directed at said trim piece along said predetermined pattern.

8. The process according to claim 1 wherein said trim piece has a multi-layer construction including an inside rigid substrate layer, said cover layer, and an intervening foam layer.

9. The process according to claim 1 wherein said laser beam is pulsed to produce said partial penetrations.

10. The process according to claim 8 wherein said substrate is continuously completely cut by said laser beam in said preweakening step.

11. A process for constructing a preweakened automotive interior trim piece covering an air bag installation, said preweakening applied in a predetermined pattern in a particular location so as to enable formation of an air bag deployment opening in said trim piece for an air bag installation covered at said location by pressure exerted by deployment of said air bag, said trim piece having an outer cover layer visible from within said vehicle interior and extending smoothly and uninterruptedly across said preweakening at said particular location, said trim piece including a rigid substrate layer underlying said cover layer said process including the steps of:

preweakening said trim piece by directing a $CO_2$ laser beam at an inside surface of said substrate layer to remove material from said trim piece;

locating a sensor on the outside of said trim piece cover layer opposite said laser beam, said sensor producing output signals corresponding to material thickness measured along said predetermined pattern;

monitoring the extent of preweakening effected by said laser beam during said preweakening to determine the material thickness remaining by analyzing said sensor output signals along said predetermined pattern;

controlling the extent of preweakening effected by said laser beam in accordance with the results of said monitoring step to produce a complete penetration of said substrate layer along said predetermined pattern and partial penetration of said cover layer at spaced apart locations along said predetermined pattern to form a stepped depth configuration; and changing the relative position of said laser beam and said trim piece to effect a predetermined level of preweakening of said trim piece along said predetermined pattern.

12. The process according to claim 11 wherein said controlling step includes the step of controlling operation of a laser beam generator generating said laser beam.

13. The process according to claim 12 wherein a change in relative position of said trim piece and said laser beam generator causes said laser beam to be directed along said predetermined pattern.

14. The process according to claim 11 wherein said trim piece comprises a construction having a foam layer in between said substrate and skin layer.

15. The process according to claim 11 wherein in said preweakening step said laser beam is pulsed.

16. The process according to claim 9 wherein said controlling step includes the step of applying a particular number of pulses corresponding to the results of said monitoring step to said trim piece at each of a series of sites on said trim piece.

17. The process according to claim 15 wherein said controlling step includes the step of applying a particular number of pulses corresponding to the results of said monitoring step to said trim piece at each of a series of sites on said trim piece.

18. The process according to claim 11 wherein said preweakening penetrates 20 to 80% of the thickness of said trim piece.

* * * * *

UNITED STATES PATENT AND TRADEMARK OFFICE
CERTIFICATE OF CORRECTION

PATENT NO.    : 6,267,918 B1
DATED         : July 31, 2001
INVENTOR(S)   : David J. Bauer It is certified that error appears in the above-identified patent and that said Letters Patent is hereby corrected as shown below:

Column 8,
Line 28, after "groove" delete "90" insert therefor -- 88 --.
Line 29, after "cover" delete "88" insert therefor -- 90 --.

Signed and Sealed this

First Day of October, 2002

Attest:

JAMES E. ROGAN
Attesting Officer    Director of the United States Patent and Trademark Office

UNITED STATES PATENT AND TRADEMARK OFFICE
CERTIFICATE OF CORRECTION

PATENT NO. : 6,267,918 B1
DATED : July 31, 2001
INVENTOR(S) : David J. Bauer

It is certified that error appears in the above-identified patent and that said Letters Patent is hereby corrected as shown below:

<u>Column 3,</u>
Line 12, delete "day" insert therefor -- dry -- .
Line 13, delete "later" insert therefor -- layer --.

<u>Column 5,</u>
Line 57, delete "having physical properties".

<u>Column 7,</u>
Line 41, delete "gage" insert therefor -- gauge --.

<u>Column 10,</u>
Line 16, after "cover layer" insert -- , --.

Signed and Sealed this

Sixth Day of May, 2003

JAMES E. ROGAN
*Director of the United States Patent and Trademark Office*